(12) United States Patent
Dunn

(10) Patent No.: US 8,763,997 B2
(45) Date of Patent: Jul. 1, 2014

(54) HELICOPTER LANDING GEAR DAMPER

(75) Inventor: Marcus L. Dunn, Stroud, OK (US)

(73) Assignee: Nanokas Aviation, L.L.C., Stroud, OK (US)

( * ) Notice: Subject to any disclaimer, the term of this patent is extended or adjusted under 35 U.S.C. 154(b) by 319 days.

(21) Appl. No.: 12/792,552

(22) Filed: Jun. 2, 2010

(65) Prior Publication Data

US 2011/0133378 A1 Jun. 9, 2011

Related U.S. Application Data

(60) Provisional application No. 61/183,127, filed on Jun. 2, 2009.

(51) Int. Cl.
*F16F 13/00* (2006.01)
*B64C 25/60* (2006.01)

(52) U.S. Cl.
USPC ............. 267/217; 267/34; 267/225; 267/226; 267/292; 267/293; 244/17.17; 244/100 R; 244/102 R; 244/102 SS; 244/104 R; 244/104 CS

(58) Field of Classification Search
CPC ........ B64C 25/00; B64C 25/06; B64C 25/10; B64C 25/14; B64C 25/52; B64C 25/60; B64C 25/62; B64C 25/64; B64C 2025/125; B64C 2025/325; B64F 2700/6226
USPC ........ 267/292, 217, 225, 226, 162, 34, 64.26; 188/266.3, 266.5, 313; 244/100 R, 244/102 R, 104 R, 102 SS, 104 CS, 17.17, 244/108
IPC .............. F16F 1/36, 13/00; B64C 25/06, 25/52, B64C 25/58, 25/60
See application file for complete search history.

(56) References Cited

U.S. PATENT DOCUMENTS 1,544,032 A * 6/1925 Potez ........................... 267/293
1,703,222 A * 2/1929 Brimm, Jr. ................ 244/104 R
(Continued)

FOREIGN PATENT DOCUMENTS

EP 0212022 3/1987
SU 901683 * 2/1982

OTHER PUBLICATIONS

International Preliminary Report on Patentability (PCT/US2010/037124); Dec. 15, 2011.
(Continued)

*Primary Examiner* — Robert A Siconolfi
*Assistant Examiner* — San Aung
(74) *Attorney, Agent, or Firm* — Dunlap Codding, P.C.

(57) ABSTRACT

A damper for a landing gear of a helicopter having a barrel, a piston defining a first hydraulic cavity between the piston and a bottom end of the barrel and a second hydraulic cavity between the piston and a top of the barrel, a stack of disc springs disposed within the first hydraulic cavity in a compressed state between the bottom end of the barrel and the piston. Each of the disc springs having a substantially concave side and an opposing substantially convex side, the disc springs stacked in an alternating pattern such that any two adjacent washers have their like sides positioned adjacent to each other. A spring disposed within the second hydraulic cavity such that the spring is compressed between the compression member and the top of the barrel when the piston is in an extended position. A hydraulic fluid is disposed inside at least a portion of the first hydraulic cavity and at least a portion of the second hydraulic cavity. At least one valve is disposed in the piston so as to establish fluid communication between the first hydraulic cavity and the second hydraulic cavity so as to allow bilateral fluid communication between the first hydraulic cavity and the second hydraulic cavity.

20 Claims, 7 Drawing Sheets

(56) References Cited

U.S. PATENT DOCUMENTS 2,661,203 A * 12/1953 Espy et al. .................... 267/225
2,695,778 A * 11/1954 Mercier et al. ................ 267/226
2,905,410 A *  9/1959 Bensen ...................... 244/17.17
3,345,019 A * 10/1967 Black et al. ................ 244/100 R
3,409,285 A * 11/1968 Maennig ...................... 267/217

4,337,912 A      7/1982  Watton
2006/0144993 A1  7/2006  Hsu et al.

OTHER PUBLICATIONS

International Search Report and Written Opinion (PCT/US2010/037124); Jan. 10, 2011.

* cited by examiner

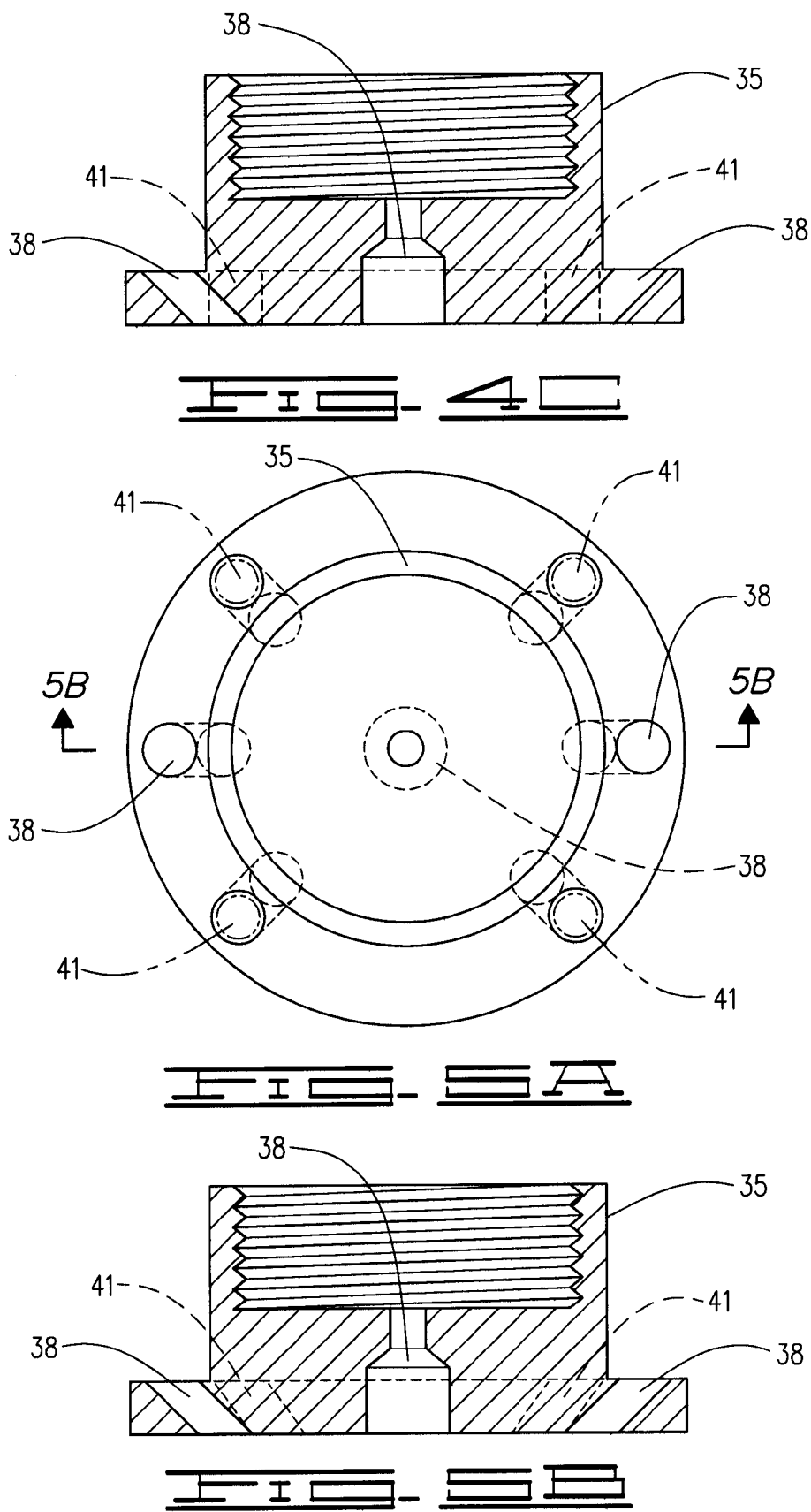

HELICOPTER LANDING GEAR DAMPER

CROSS-REFERENCE TO RELATED APPLICATIONS

This application claims the benefit of U.S. Provisional Application No. 61/183,127, filed Jun. 2, 2009, which is hereby incorporated herein in its entirety.

BACKGROUND OF THE INVENTION

1. Field of the Invention

The present invention relates in general to a landing gear damper and, more particularly, but not by way of limitation, to a landing gear damper for a helicopter which allows for appropriate ground resonance performance.

2. Brief Description of Related Art

Aircraft landing gears, such as landing gears for airplanes, helicopters, and other aircraft are typically equipped with hydraulic damper systems and struts to absorb forces during aircraft landing and to help support the aircraft while on the ground. Helicopter landing gears absorb the energy from landings through damper motion and elastic deformation of struts.

Helicopter landing gears have unique design requirements. Military helicopter landing gears are required to function in vertical sink speeds ranging from 8 ft/sec limit landing to 42 ft/sec crash landing conditions. To provide protection to the airframe, other aircraft components, and cargo, multistage shock struts with controlled mechanical failures are utilized. Some civil helicopters utilize shock struts in combination with skid gears. Although the sink speed ranges for civil helicopters are less stringent than those for military helicopters, ground resonance, static ground position, structural and economic considerations are still relevant.

One critical design requirement for helicopters is static ground clearance, or the ability of the landing gear to support the helicopter's weight without "bottoming out." Static ground clearance is one of a myriad of design requirements for helicopter landing gears, for example, energy absorption capability, load factor, ground resonance and the like. The landing gear damper is one of the key components most influenced by design requirements.

Static ground clearance for helicopters can be increased by reducing damper stroke. Typically, this is facilitated by utilizing a nitrogen containing damper in which the amount of nitrogen in the damper system is increased. Nitrogen containing dampers are replete with drawbacks. For example, any leakage of nitrogen (a common problem with current systems) causes adverse performance of the damper, such as ground resonance problems.

Thus, a need exists for a helicopter landing gear damper which reduces the need for maintenance of the same and provides for enhanced performance, and reduced ground resonance. It is to such an apparatus that the present invention is directed.

BRIEF DESCRIPTION OF THE SEVERAL VIEWS OF THE DRAWINGS

FIG. 4C is a sectional view taken along line 4C-4C of FIG. 4B.

FIG. 6 is a sectional view of another embodiment of a barrel having a pressure relief member.

DETAILED DESCRIPTION OF EXEMPLARY EMBODIMENTS

Figure 1:
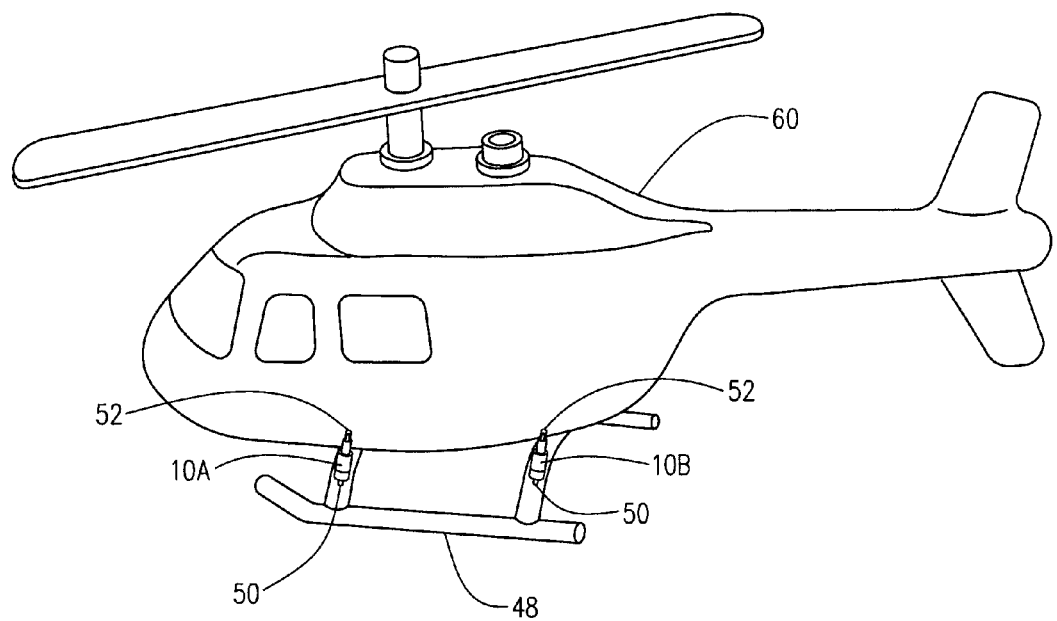
FIG. 1 is a perspective view of a helicopter having a front helicopter landing gear damper and a rear helicopter landing gear damper.

Referring now to the drawings, and more particularly to FIG. 1, shown therein is a pictorial representation of a helicopter 8 shown equipped with a plurality of helicopter landing gear dampers 10 constructed in accordance with the present invention. As discussed above, the landing gear dampers 10 function to absorb forces during landing operations and to help support the helicopter when on the ground.

Figure 2:
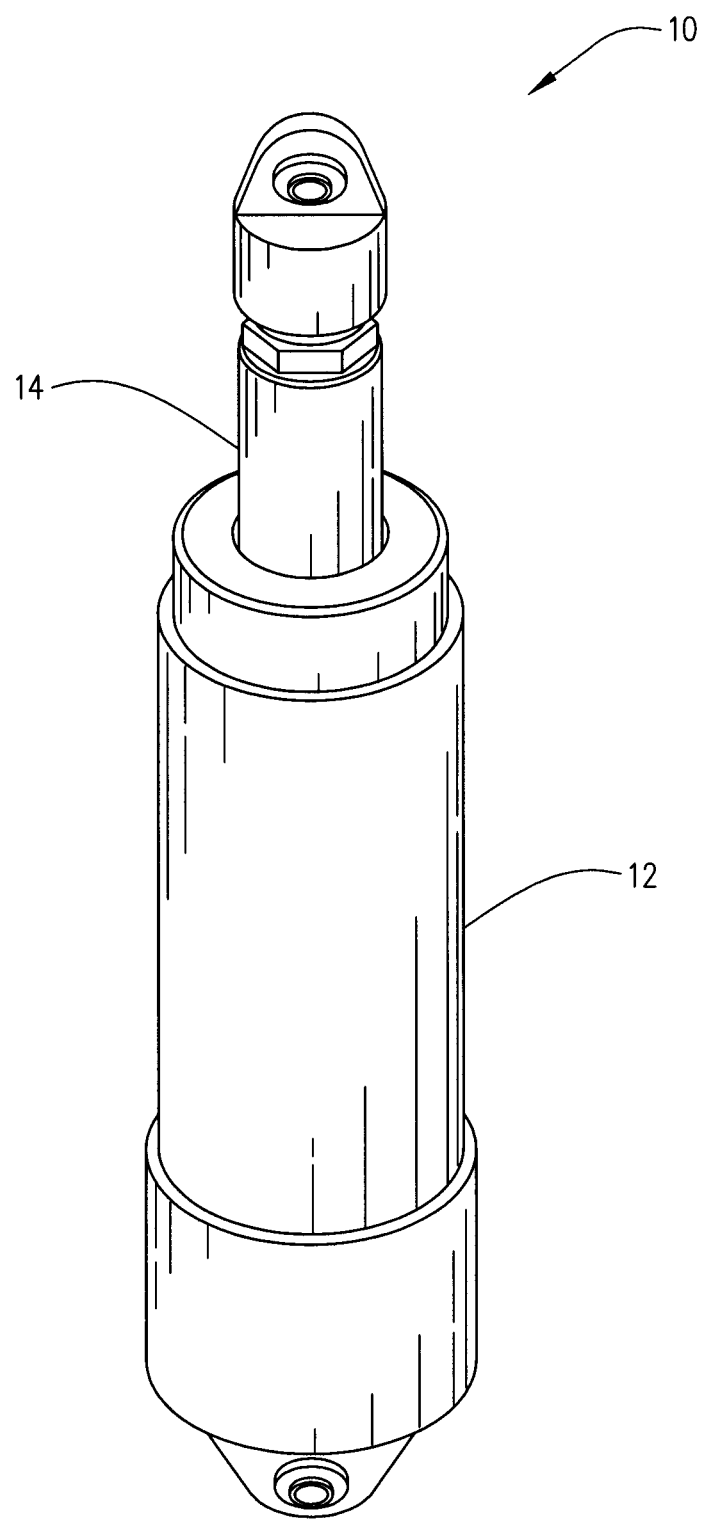
FIG. 2 is a perspective view of a helicopter landing gear damper constructed in accordance with the present invention.
Figure 3A:
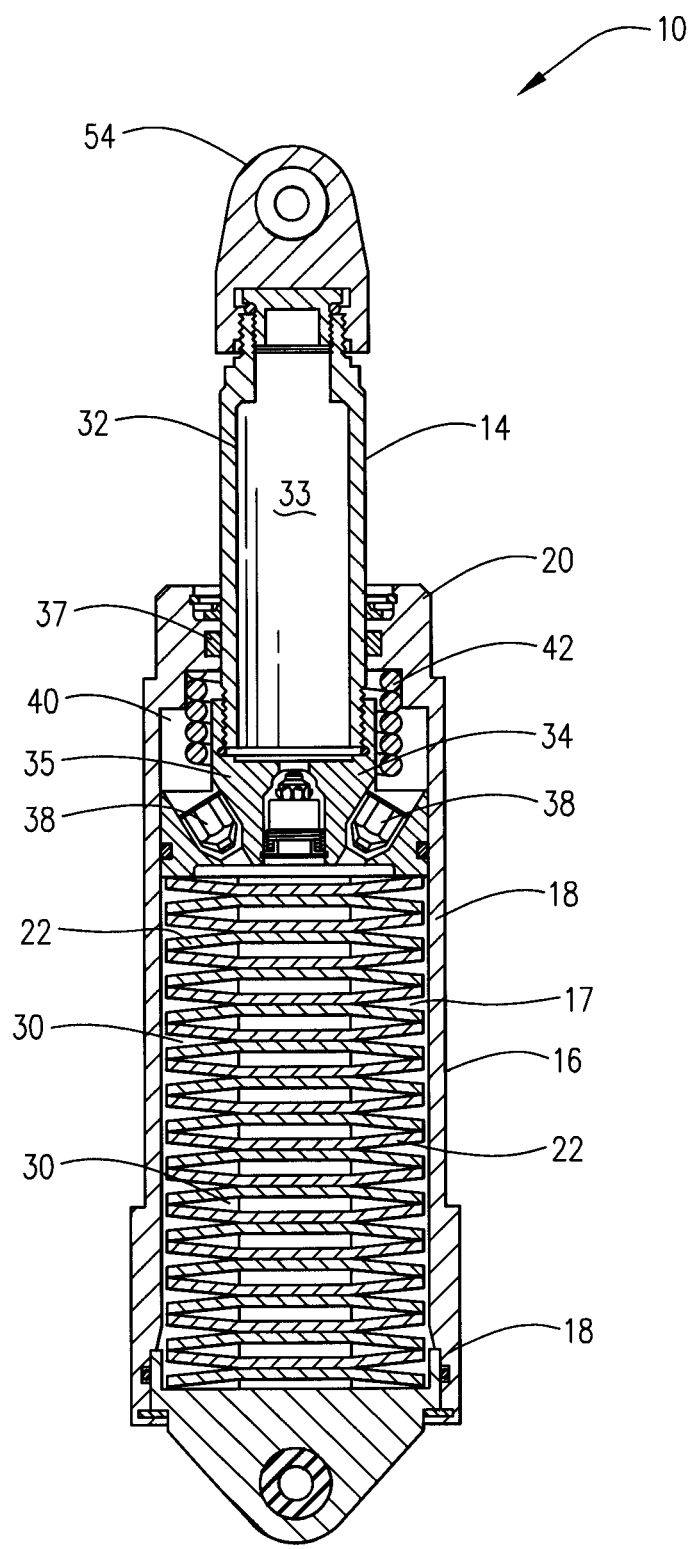
FIG. 3A is a cross sectional view of the helicopter landing gear damper of FIG. 2.
Figure 3B:
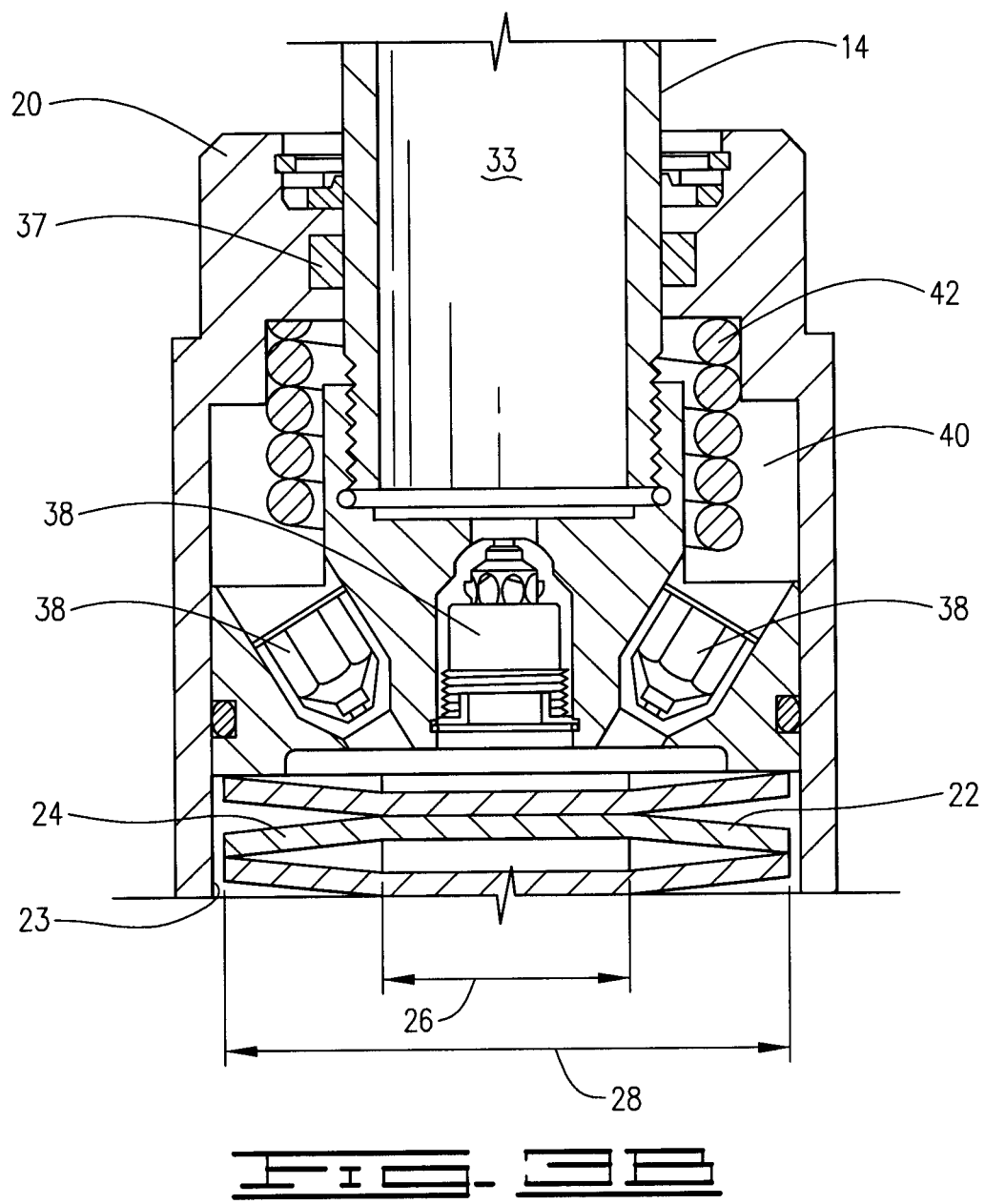
FIG. 3B is a fragmented cross sectional view of the helicopter landing gear damper of FIGS. 2 and 3.
Figure 4A:
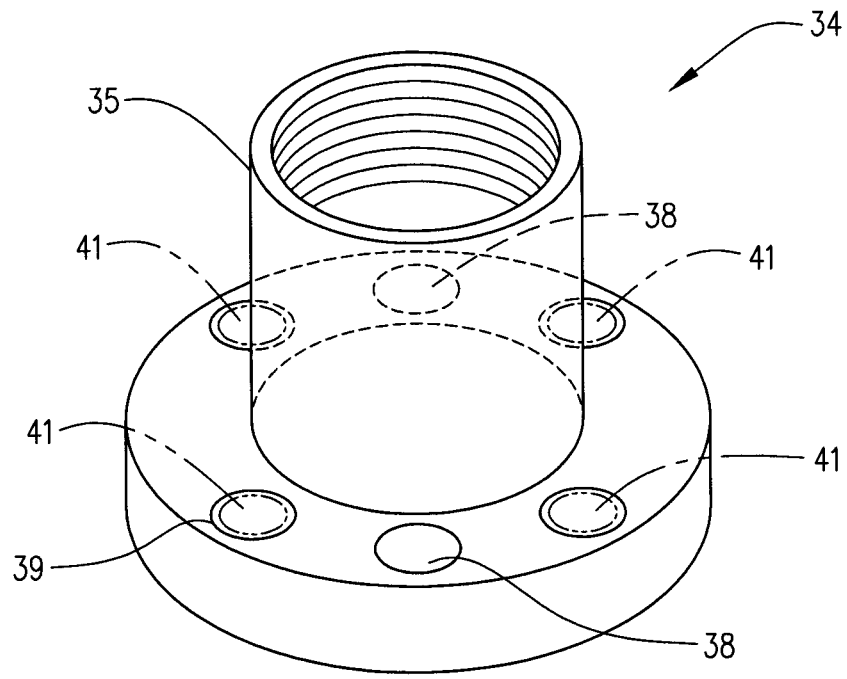
FIG. 4A is a perspective view of a compression member of a piston of the helicopter landing gear damper of the present invention.
Figure 4B:
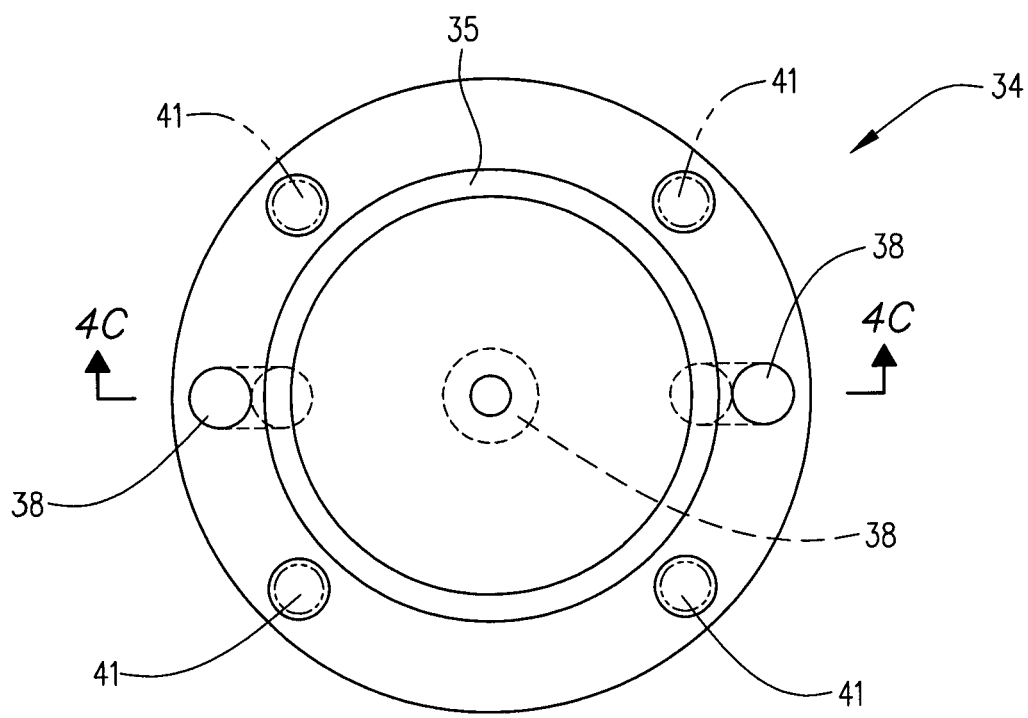
FIG. 4B is a top plan view of the compression member of FIG. 4A.

Referring now to FIGS. 2-3B, the landing gear damper 10 is provided with a barrel 12 and a piston 14. The barrel 12 is provided with a hollow shaft 16 which defines a first hydraulic cavity 17. The barrel 12 is fabricated from a substantially rigid material having a substantially tubular cross sectional area. Furthermore, the hollow shaft 16 is sealed on a bottom end 18 and has a top end 20 which is adapted to receive and/or retain at least a portion of the piston 14. It will be understood that the hollow shaft 16 may be fabricated with any number of different materials, for example, an anodized metal and/or differing cross sectional areas that would be known to one of ordinary skill in the art having the present disclosure before them are likewise contemplated for use in accordance with the present invention.

The barrel 12 includes a plurality of cupped spring washers or disc springs 22, hereinafter referred to as disc springs 22, disposed within the first hydraulic cavity 17 of the barrel 12. The disc springs 22 are provided with a body portion 24 having an inner diameter 26 and outer diameter 28 (FIGS. 3A and 3B). The outer diameter 28 of the disc springs 22 is smaller than the internal diameter of the barrel 12 such that when the disc springs 22 are compressed they traverse linearly within the first hydraulic cavity 17 without impinging against the inner surface 23 of the barrel 12. Furthermore, the disc springs 22 are provided with a concave geometry, and are stacked to create a spring-like mechanism which exhibits spring-like behavior.

To facilitate spring-like behavior the disc springs 22 are stacked within the first hydraulic cavity 17 in an alternating pattern so that when one of the disc spring 22 is disposed with the curved side up, the curved side of the adjacently disposed disc springs 22 is disposed downwardly. Furthermore, if the curved side of the disc spring 22 is disposed downwardly, the curved side of the disc spring immediately below it is disposed upwardly. Thus, when a load is applied to the stacked disc springs 22, the disc springs 22 compress together absorbing a portion of the energy transferred to them by the load. It will be understood that using disc springs 22 with differing inner diameters 26 produces disc spring stacks with different spring coefficients. This allows each landing gear damper 10 to be tailored to specific installations and/or applications. By way of a non-limiting example, the disc springs 22 are stacked such that the inner diameter 26 of the disc springs increases from the top of the stack to the bottom.

The piston 14 is at least partially positioned within the barrel 12. The piston 14 includes a shaft 32 and a compression member 34. The shaft 32 may have a piston cavity 33. To further seal the landing gear damper 10, a seal member 37 is disposed between the piston 14 and the shaft 32 of the barrel 12. By way of a non-limiting example, the seal member 37 may include a hat-seal or an o-ring.

A hydraulic fluid 30 is disposed within the first hydraulic cavity 17 of the barrel 12 and operates to absorb and/or transfer energy transmitted to the hydraulic fluid 30 from the piston 14. The hydraulic fluid is at substantially ambient pressure when the piston is in the extended position.

The compression member 34 may be an integral member with the shaft 32. The compression member 34 generally has an upper stem 35, and the compression member 34 has an outer diameter which is slightly smaller than the inner diameter of the barrel 12, so as to allow the compression member 34 to traverse within the first hydraulic cavity 17 of the barrel 12 without impingement when the piston 14 is moved linearly within the barrel 12. To retain the hydraulic fluid 30 within the first hydraulic cavity 17 of the barrel 12, the compression member 34 may include an o-ring seal 36.

The compression member 34 includes at least one valve 38, such as a poppet valve. The valves 38 operate to provide fluid communication of the hydraulic fluid 30 from within the first hydraulic cavity 17 of the barrel 12 into a second hydraulic cavity 40 and/or the cavity 33. As the piston 14 moves linearly through the barrel 12 and compresses the disc springs 22 and the hydraulic fluid 30, the size (i.e., the volume) of the second hydraulic cavity 40 increases proportionally. By allowing the hydraulic fluid 30 to at least partially transfer into the second hydraulic cavity 40 and/or the cavity 33 regulates the pressures exerted on the hydraulic fluid 30 and the disc springs 22, thus improving the performance of the landing gear damper 10.

Referring now to FIGS. 3A, 3B, and 4A-4C collectively, it will be understood that if the force exerted on the landing gear damper 10 during, for example, a crash landing is too great, the landing gear damper 10 may not be able to transfer fluid quickly enough from the first hydraulic cavity 17 of the barrel 12 into the second hydraulic cavity 40 and/or the cavity 33. Such a failure to effectively transfer the hydraulic fluid 30 from the first hydraulic cavity 17 of the barrel 12 into the second hydraulic cavity 40 and/or the cavity 33 may cause the landing gear damper 10 to fail in absorbing and damping landing forces which may result in potentially significant damage to the helicopter 8. Therefore, the compression member 34 may further include one or more pressure relief members 39. The pressure relief members 39 are provided for crash landing speeds ranging from approximately 25 ft/sec and greater. The pressure relief members 39 may include, for example, a membrane, valve, wafer or the like. During landings speeds ranging from approximately 25 ft/sec and greater, the pressure exerted on the hydraulic fluid 30 by the compression member 34 causes the pressure relief members 39 to transfer the hydraulic fluid 30 contained within the first hydraulic cavity 17 of the barrel 12 into at least one of the second hydraulic cavity 40 and/or the piston cavity 33 at a greater volume than the hydraulic fluid 30 would transfer via the valves 38 alone.

Figure 5:
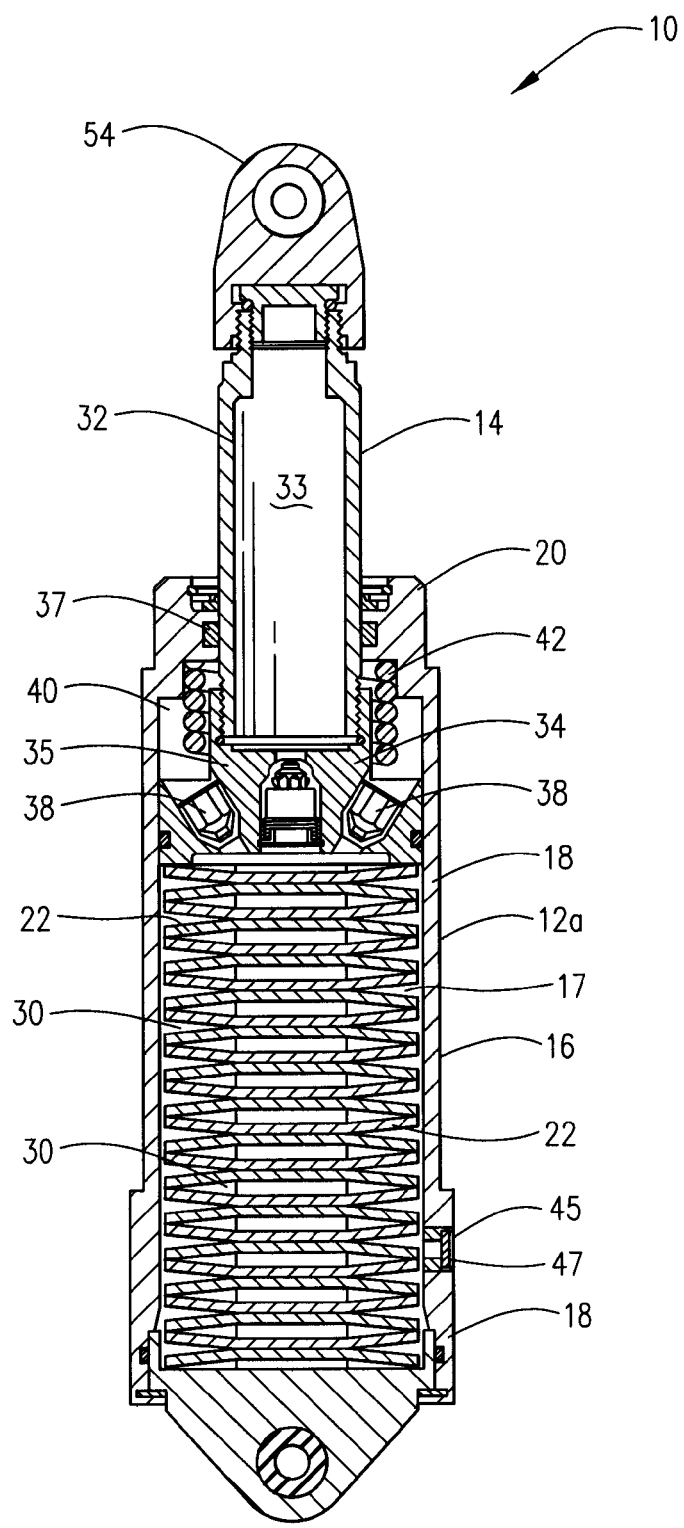
FIG. 5A is a bottom plan view of another embodiment of a compression member of the piston of the helicopter landing gear damper of the present invention.
FIG. 5B is a sectional view taken along line 5B-5B of FIG. 5A.

By way of non-limiting example, each of the pressure relief members 39 includes a pressure operated membrane 43 covering apertures 41. The apertures 41 may be fabricated as substantially linear apertures (FIGS. 4A-4C), as angled apertures (FIGS. 5A and 5B), or as a combination thereof. The apertures 41 allow fluid communication between the first hydraulic cavity 17 of the barrel 12 into the second hydraulic cavity 17. During normal operation (i.e., landing speeds of 1 to 20 ft/sec) the pressure operated membranes 43 preclude hydraulic fluid from transferring through the apertures 41 and therefore allow the hydraulic fluid 30 to transfer only via the valves 38 as discussed previously. During crash landing operations, increased pressure caused by the helicopter impacting the ground at an increased landing speed causes the pressure operated membranes 43 to separate from apertures 41 in such a way that the hydraulic fluid 30 in the first hydraulic cavity 17 of the barrel 12 is rapidly transferred into at least one of the second hydraulic cavity 40 and/or the cavity 33. The rapid transfer of the hydraulic fluid 30 creates a "softer" landing and may reduce damage to the helicopter during crash landing situations.

FIG. 6 shows another embodiment of a barrel 12a provided with a pressure relief member 45. The pressure relief member 45 will allow further dampening in a hard landing situations, such as during a crash landing, by allowing the hydraulic fluid in the barrel 12a to be expelled from the barrel 12a.

By way of non-limiting example, the pressure relief member 45 may include a rupture disc 47. During normal operation (i.e., landing speeds of 1 to 20 ft/sec) the pressure relief member 45 precludes hydraulic fluid from transferring from the barrel 12a. During crash landing operations, increased pressure caused by the helicopter impacting the ground at an increased landing speed causes the rupture disc 47 to burst in such a way that the hydraulic fluid in the first hydraulic cavity 17 of the barrel 12a is rapidly transferred from the barrel 12a.

Normal category and military helicopters are designed to auto rotate (engine inoperative). The "crush box" (seats and belly structure) are designed to absorb approximately 10 G forces upon an auto rotation (engine inoperative), and is calculated to make survival possible for the crew and passengers. This computes to approximately 16 feet per second rate of descent. Test has also shown the a gross or over gross helicopter can and has a descent rate of 32 feet per second. This, of course, is fatal to all passengers and crew. Accordingly, the pressure relief member 45 may, by way of example, be adjusted to relieve the pressure at approximately 10 G forces.

Referring again to FIGS. 3A and 3B, the landing gear damper 10 also includes a compression spring 42 for regulating the upward linear movement of the piston 14 relative to the top end 20 of the barrel 12. It will be understood that the compression spring 42 may include, for example, a coiled compression spring. The compression spring 42 is positioned around the compression member 34 and is at least partially positioned within the second hydraulic cavity 40. To regulate upward linear movement of the piston 14, the upper flange 35 of the compression member 34 of the piston 14 operates to compress the compression spring 42 against the top section 44 of the barrel 12. As the piston 14 moves in an upward linear direction, the hydraulic fluid 30 contained within the second hydraulic cavity 40 and/or the cavity 33 is transferred back into the first hydraulic cavity 17 of the barrel 12. Although the compression spring 42 has been disclosed as including a coiled compression spring, any number of different elastomeric materials and/or components that would be known to one of ordinary skill in the art having the present disclosure before them are likewise contemplated for use in accordance with the present invention.

Referring now to FIGS. 1 and 3A-3B, the helicopter 8 includes a pair of skids 48. The skids 48 are adapted to contact the ground when the helicopter 8 is landing or at rest. Each of the landing gear dampers 10A and 10B is secured to the skid 48 by a bottom bushing 50. Each of the landing gear dampers 10A and 10B is further secured to the helicopter 8 via a top bushing 52. The securement of the top bushing 52 to the helicopter 8 may occur at any location on the helicopter (i.e., externally or internally).

In operation, when the helicopter 8 contacts the ground, the weight of the helicopter 8 is distributed over downwardly through the skids 48 and actuates the landing gear damper 10. The load is applied to the top bushing 54 and acts to move the piston 14, and therefore the compression member 34 linearly downward into the first hydraulic cavity 17 of the barrel 12. The linear movement both compresses the disc springs 22 and transfers at least a portion of the hydraulic fluid 30 contained within the first hydraulic cavity 17 to the second hydraulic cavity 40 and/or the piston cavity 33. When the helicopter 8 takes off, the piston 14 moves linearly upward and transfers at least a portion of the hydraulic fluid 30 contained within the second hydraulic cavity 40 and/or the piston cavity 33 into the first hydraulic cavity 17. To regulate the movement of the piston 14 in the upward direction, the compression member 34 compresses the compression spring 42 against the top section 44 of the barrel 12.

It will be understood that the helicopter 8 may include a pair of forward landing gear dampers 10A and a pair of rear landing gear dampers 10B. For illustrative purposes, only one half of the landing gear dampers 10A and 10B are shown in FIG. 1. When the helicopter 8 is in a stored position (not shown), for example, when the helicopter's rotors 60 are disposed in a swept back configuration (also not shown), the center of gravity of the helicopter 8 is transferred rearwardly to the rear landing gear dampers 10B. Unlike typical dampers which utilize a gas that may leak from the damper under constant strain, the hydraulic fluid 30 bears the added weight exerted on the rear landing gear dampers 10B without losses.

From the above description it is clear that the present invention is well adapted to carry out the objects and to attain the advantages mentioned herein as well as those inherent in the invention. While presently preferred embodiments of the invention have been described for purposes of this disclosure, it will be understood that numerous changes may be made which will readily suggest themselves to those skilled in the art and which are accomplished within the spirit of the invention disclosed and as defined in the appended claims.

What is claimed:

1. A damper for a landing gear of a helicopter, comprising:
a barrel having a bottom end, a top end, and a cavity;
a piston having a shaft and a compression member connected to the shaft, the compression member and at least a portion of the shaft extending into at least a portion of the cavity of the barrel via the top end of the barrel such that the compression member and the barrel define a first hydraulic cavity between the compression member and the bottom end of the barrel and the compression member and the top end of the barrel define a second hydraulic cavity between the compression member and the top of the barrel, the piston linearly moveable between a retracted position and an extended position upon application of an axial force to at least one of the barrel and the piston;
a stack of disc springs disposed within the first hydraulic cavity in a compressed state between the bottom end of the barrel and the compression member, each of the disc springs having a substantially concave side and an opposing substantially convex side, the disc springs stacked in an alternating pattern such that any two adjacent washers have their like sides positioned adjacent to each other;
a spring disposed within the second hydraulic cavity such that the spring is compressed between the compression member and the top of the barrel when the piston is in the extended position thus regulating the upward linear movement of the piston relative to the top end of the barrel;
a hydraulic fluid disposed inside at least a portion of the first hydraulic cavity and at least a portion of the second hydraulic cavity;
at least one valve disposed in the compression member so as to establish bilateral fluid communication between the first hydraulic cavity and the second hydraulic cavity through the valve; and
at least one pressure relief member having a normal mode of operation and a crash mode of operation such that in the normal mode of operation the pressure relief member precludes fluid flow through the pressure relief member, and in the crash mode of operation the pressure relief member establishes greater fluid flow from the first hydraulic cavity through the pressure relief member.

2. The damper of claim 1, wherein the compression member has a plurality of valves positioned between the first hydraulic cavity and the second hydraulic cavity.

3. The damper of claim 1, wherein the at least one pressure relief member is disposed in the compression member between the first hydraulic cavity and the second hydraulic cavity such that in the crash mode of operation, the pressure relief member establishes greater fluid communication between the first hydraulic cavity and the second hydraulic cavity.

4. The damper of claim 1, wherein the at least one pressure relief member is positioned between the first hydraulic cavity and an exterior side of the barrel such that in the crash mode of operation, the pressure relief member establishes fluid flow to the exterior side of the barrel.

5. The damper of claim 1, wherein the stack of disc springs includes disc springs having at least two different levels of compression resistance.

6. The damper of claim 5, wherein the disc springs are stacked in ascending order from least resistant adjacent the compression member to most resistant adjacent the bottom end of the barrel.

7. The damper of claim 1, wherein the spring is a coiled spring.

8. The damper of claim 1, wherein the hydraulic fluid is at substantially ambient pressure when the piston is in the extended position.

9. The damper of claim 1, wherein the stack of disc springs and the spring cooperate to apply a sufficient force on the piston to support the piston in the extended position when no compressive force is being applied to the piston.

10. A landing gear damper in combination with a helicopter having a frame and at least one skid, the landing gear damper comprising:
a barrel having a bottom end, a top end, and a cavity, the bottom of the barrel connected to the skid;
a piston having a shaft and a compression member connected to the shaft, one end of the shaft being connected to the frame of the helicopter and the other end being connected to the compression member, at least a portion of the shaft extending into at least a portion of the cavity of the barrel via the top end of the barrel such that the compression member and the barrel define a first hydraulic cavity between the compression member and the bottom end of the barrel and the compression member and the top end of the barrel define a second hydraulic cavity between the compression member and the top of the barrel, the piston linearly moveable between a retracted position and an extended position upon application of an axial force to at least one of the barrel and the piston;

a stack of disc springs disposed within the first hydraulic cavity in a compressed state between the bottom end of the barrel and the compression member, each of the disc springs having a substantially concave side and an opposing substantially convex side, the disc springs stacked in an alternating pattern such that any two adjacent washers have their like sides positioned adjacent to each other;

a spring disposed within the second hydraulic cavity such that the spring is compressed between the compression member and the top of the barrel when the piston is in the extended position thus regulating the upward linear movement of the piston relative to the top end of the barrel;

a hydraulic fluid disposed inside at least a portion of the first hydraulic cavity and at least a portion of the second hydraulic cavity;

at least one valve disposed in the compression member so as to establish bilateral fluid communication between the first hydraulic cavity and the second hydraulic cavity through the valve; and at least one pressure relief member having a normal mode of operation and a crash mode of operation such that in the normal mode of operation the pressure relief member precludes fluid flow through the pressure relief member, and in the crash mode of operation the pressure relief member establishes greater fluid flow from the first hydraulic cavity through the pressure relief member.

11. The combination of claim 10, wherein the compression member has a plurality of valves positioned between the first hydraulic cavity and the second hydraulic cavity.

12. The combination of claim 11, wherein the at least one pressure relief member is disposed in the compression member between the first hydraulic cavity and the second hydraulic cavity such that in the crash mode of operation, the pressure relief member establishes greater fluid communication between the first hydraulic cavity and the second hydraulic cavity.

13. The combination of claim 12, wherein the at least one pressure relief member disposed in the compression member is a first pressure relief member, and wherein a second pressure relief member is positioned between the first hydraulic cavity and an exterior side of the barrel such that in the crash mode of operation, the pressure relief member establishes fluid flow to the exterior side of the barrel.

14. The combination of claim 10, wherein the at least one pressure relief member is positioned between the first hydraulic cavity and an exterior side of the barrel such that in the crash mode of operation, the pressure relief member establishes fluid flow to the exterior side of the barrel.

15. The combination of claim 10, wherein the stack of disc springs includes disc springs having at least two different levels of compression resistance.

16. The combination of claim 15, wherein the disc springs are stacked in ascending order from least resistant adjacent the compression member to most resistant adjacent the bottom end of the barrel.

17. The combination of claim 10, wherein the spring is a coiled spring.

18. The combination of claim 10, wherein the hydraulic fluid is at substantially ambient pressure when the piston is in the extended position.

19. The combination of claim 10, wherein the stack of disc springs and the spring cooperate to apply a sufficient force on the piston to support the piston in the extended position when no compressive force is being applied to the piston.

20. The combination of claim 10, wherein the piston has a third hydraulic cavity within the shaft, wherein the hydraulic fluid is disposed inside at least a portion of the third hydraulic cavity, and wherein the at least one valve in the compression member comprises at least one valve disposed so as to establish bilateral fluid communication between the first hydraulic cavity and the third hydraulic cavity through the valve.

* * * * *